United States Patent [19]

Johnson et al.

[11] Patent Number: 4,991,011
[45] Date of Patent: Feb. 5, 1991

[54] INTERACTIVE TELEVISION TERMINAL WITH PROGRAMMABLE BACKGROUND AUDIO OR VIDEO

[75] Inventors: Lee R. Johnson, Lawrenceville; Elizabeth A. Smith, Cumming, both of Ga.

[73] Assignee: Scientific-Atlanta, Inc., Atlanta, Ga.

[21] Appl. No.: 340,967

[22] Filed: Apr. 20, 1989

Related U.S. Application Data

[63] Continuation-in-part of Ser. No. 289,218, Dec. 23, 1988.

[51] Int. Cl.⁵ .................. H04N 7/04; H04N 7/10; H04N 5/50
[52] U.S. Cl. ........................ 358/141; 358/86; 358/143; 358/191.1
[58] Field of Search .......... 358/86, 141, 147, 146, 358/143, 72, 187, 191.1

[56] References Cited

U.S. PATENT DOCUMENTS

| | | | |
|---|---|---|---|
| 3,221,098 | 11/1965 | Feldman et al. | 358/198 |
| 3,894,177 | 7/1975 | Howell et al. | 358/143 |
| 3,968,327 | 7/1976 | Gregg, III | 358/86 |
| 4,319,277 | 3/1982 | Nicholson et al. | 358/165 |
| 4,439,784 | 3/1984 | Furukawa et al. | 358/86 |
| 4,510,568 | 4/1985 | Kishi et al. | 364/300 |
| 4,536,791 | 8/1985 | Campbell et al. | 358/122 |
| 4,575,750 | 3/1986 | Callahan | 358/86 |
| 4,586,158 | 4/1986 | Brandle | 364/900 |
| 4,633,297 | 12/1986 | Skerlos et al. | 358/147 |
| 4,677,488 | 6/1987 | Zato | 358/147 |
| 4,688,167 | 8/1987 | Agarwal | 364/200 |
| 4,698,670 | 10/1987 | Matty | 358/86 |
| 4,701,794 | 10/1987 | Fröling et al. | 358/147 |
| 4,718,107 | 1/1988 | Hayes | 455/4 |
| 4,734,764 | 3/1988 | Pocock et al. | 358/86 |
| 4,782,463 | 11/1988 | Sanders et al. | 364/900 |
| 4,786,967 | 11/1988 | Smith, III et al. | 358/143 |
| 4,789,863 | 12/1988 | Bush | 340/825 |

Primary Examiner—John K. Peng
Attorney, Agent, or Firm—Banner, Birch, McKie & Beckett

[57] ABSTRACT

Apparatus for use in a television terminal selectively provides a background audio or video signal or both to accompany display of a screen of textual information. The apparatus comprises a tuning circuit for tuning to a predetermined background channel determined by user selection of a particular textual information screen for display. As a result, dinner music may accompany textual informative screens related to the choice of a meal. Alternatively, instructions on how to purchase a movie might be accompanied in the background by the movie. Either the movie picture or the sound or both may accompany the instruction screen.

7 Claims, 3 Drawing Sheets

INTERACTIVE TELEVISION TERMINAL WITH PROGRAMMABLE BACKGROUND AUDIO OR VIDEO

This is a continuation-in-part application of U.S. application Ser. No. 289,218, filed Dec. 23, 1988 and entitled "Automatic Interactive Television Terminal Configuration" and is related to U.S. application Ser. Nos.: 07,340,642, entitled "Cable Television Transaction Terminal"; 07,342,987, entitled "Storage Control Method and Apparatus for an Interactive Television Terminal"; 07,340,731, entitled "Terminal Authorization Method", 07,340,640, entitled "Interactive Room Status/Time Information System"; and 07,340,659, entitled "Terminal Polling Method" filed concurrently herewith.

BACKGROUND OF THE INVENTION

1. Technical Field

This invention primarily relates to the field of two interactive entertainment systems typically provided over cable facilities to a user and, more particularly, to terminal method and apparatus enabling a programmed background audio or video signal to be displayed as a background at an associated television receiver.

2. Description of the Relevant Art

Two way interactive cable television systems are known for transmitting entertainment, information and data signals over a cable facility toward a plurality of users. Data may be transmitted and addressed to a particular subscriber over a separate data channel, out of band, or a so-called "in-band" data channel within the video signal, for example, in the vertical blanking interval. In a downstream direction, addressed control data may represent services authorized to a particular terminal or control commands to that terminal. In an upstream direction from a terminal to the service provide or system manager location, control data may represent selections made by a user in response to a polling request or at the time of user selection.

Terminals are often manufactured with stored unique identification numbers which may be unknown to a user for security purposes. Nevertheless, the unique identification number is necessary for the system manager to address a terminal in the system. When video and audio services are requested from the terminal, the address is used to specifically indicate destinations for services requested so that information associated with delivery of a requested service may be delivered to the requesting terminal.

In the instance of teletext services, screens of at least textual characters are delivered to terminals and are displayed on an associated television receiver. According to Campbell et al., U.S. Pat. No. 4,536,791, an addressable cable television terminal comprises a text/graphics generator. Data signals including control and text signals are inserted on the vertical interval of television signals transmitted to the terminal. Moreover, full-channel teletext data in video line format is transmitted to the terminal on dedicated text channels. Data retrieved from the transmitted television signal may be overlaid on the image created by the video signal. For example, a channel number retrieved from the vertical interval can appear in the foreground and a tuned-to program appears in the backgrounds of a display.

It is also known in a television receiver to selectively tune to a radio broadcast of an audio signal for accompanying a video program. In this manner, stereo audio or audio in a foreign language may accompany a television program whose audio portion is neither stereo nor in the selected language.

A requirement, however, exists in the art for a selectable overlay of text upon a video program or an audio program or both to accompany a text screen. For example, in the provision of premium television program services, textual instructions would selectively and programmably be displayed in the foreground and a preview of a premium program appear in the background with or without accompanying audio. In the presentation of teletext screens offering room service in a hotel room and advertising dinner selections, dinner music may be tuned and played in the background from a dinner musice audio channel and accompany the teletext screens for room service as they are displayed.

SUMMARY OF THE INVENTION

It is an object of the present invention to provide apparatus of an interactive terminal for switchably providing background music for accompanying a foreground textual screen.

It is an object of the present invention to provide apparatus of an interactive terminal for switchably providing background video for accompanying a foreground textual screen.

It is an object of the present invention to provide apparatus of an interactive terminal for switchably providing background audio or video or both according to predetermined programming information associated with a textual screen.

To accomplish these objects, it is a further object of the present invention to provide a method of enabling preprogrammed video or audio or both to accompany a textual screen in the background.

The apparatus for use in a television terminal according to the present invention comprises a first switch under processor control for switching a programmably selected channel which may comprise audio or video or both signals for display. A second switch under processor control switches a programmably selected output of a teletext generator. The outputs of both the first and second switches are provided via a summation circuit for display.

During the creation of a teletext screen for storage in a memory at a system manager location, a template for the screen is completed in which the template is associated with an indication of the background audio/video channel. Consequently, when the screen template is requested by a terminal, the background channel indication is retrieved from the system manager and locally stored with the requested screen in terminal memory. Also an indication is stored as to whether background audio is enabled or not.

Consequently, according to the present method, when a particular screen is selected by the user for display, the video and/or audio or both programmed at the system manager will accompany the screen as background. Furthermore, if a particular teletext service is associated with a number of screens displayed serially, the background will continuously be provided as audio or video or both throughout the display of the series of screens.

These and other features of the present invention will become evident from the following description of the drawings.

DETAILED DESCRIPTION

Figure 1:
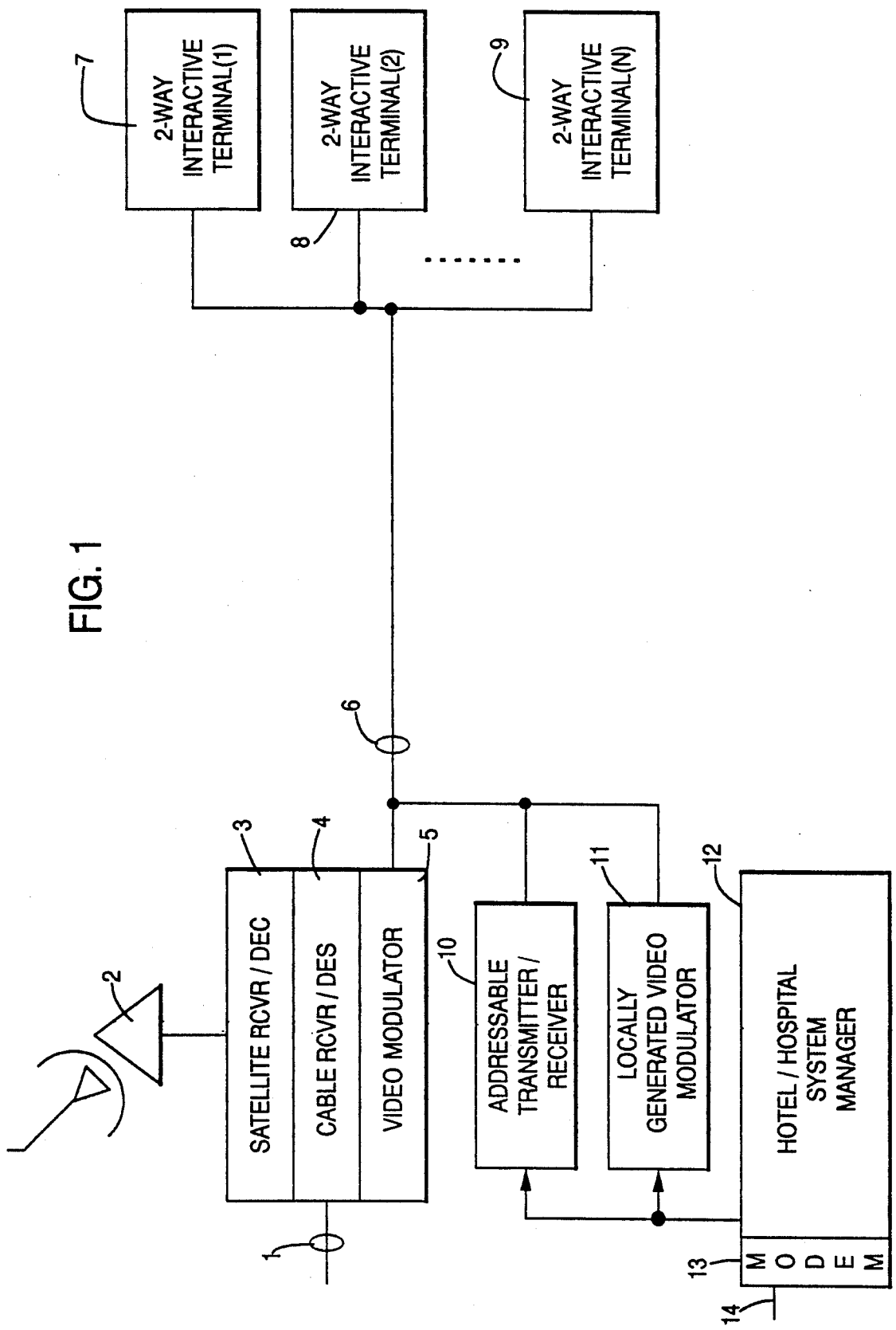
FIG. 1 is a block schematic diagram of an interactive entertainment system in accordance with the present invention applied in a hotel or hospital system environment comprising 2-way interactive terminals.

Referring to FIG. 1, there is shown a block schematic diagram of an interactive entertainment system comprising terminal apparatus in accordance with the present invention. The depicted embodiments relates to its application in a hotel or hospital system environment; however, the present invention is not so limited. The present invention may also be applied in any two-way interactive or one-way non-interactive entertainment system such as a cable or satellite television entertainment system involving a distribution network comprising trunk lines and feeder cables of optical or coaxial cable. For example, satellite receiver and decoder 3, cable receiver and descrambler 4, video modulator 5, addressable transmitter receiver 10, locally generated video modulator 11, and system manager 12 may all be located at the location of a cable television system head end. In this example, coaxial cable or optical fiber link 6 can connect the cable television head end to two-way interactive terminals 7, 8 or 9 of the entertainment system located at individual subscriber premises.

On the other hand, the embodiment of FIG. 1 is especially exemplary of the application of the present invention in a hotel or hospital entertainment system. Transmission link 6, then, may simply comprise a coaxial or optical fiber cable link between an entertainment control center and N terminals, for example, terminals 7, 8 or 9 located in rooms of the facility.

In particular, at the system control center, a satellite signal may be received at satellite antenna 2 and then received and decoded at satellite receiver decoder 3 for distribution via modulator 5 over a distribution cable 6 to the interactive terminals 7, 8 or 9 of the present invention. Additionally, a band of cable television channels received over cable facilities 1 are received and, if necessary, descrambled at cable receiver/descrambler 4. The descrambled video signals are then modulated at modulator 5 for distribution over facilities 6 to interactive terminals 7, 8 or 9. If desired, an optical scrambler may be provided for scrambling premium channel transmissions to interactive terminals 7, 8 or 9. Of course, terminal 7, 8 or 9, then, would comprise descrambler circuitry capable of descrambling the scrambled premium channel transmissions. Such circuitry is not shown in either FIG. 1 or 2 but would be preferable in a system involving distribution of signals to remote subscriber locations.

According to the exemplary embodiment of FIG. 1, the hotel or hospital location may be connected to other hotels or hospitals via data link 14. Over data link 14, data may be received via modem 13 at system manager 12. In this matter, the hotel or hospital system manager may maintain current status of all features and all interactive terminals of an entertainment system comprising a plurality of hotels. For example, entertainment schedules may be distributed over the data transmission link from a network control center where the entertainment schedule is composed. System manager 12 comprises a data processing unit and appropriate memory for storing status and features associate with all terminals in the system. System manager 12 also controls the generation of video channels at modulator 11, if necessary, for transmission over facility 6 of the two-way interactive terminals 7, 8 or 9. In particular, modulator 11 comprises the capability to generate signals for actuating the selected display of character screens at terminal locations responsive to the control of the system manager 12 in the event, for example, that terminals are unable to generate the characters screens themselves.

The generation of complete screens of characters for transmission to a terminal according to the present invention for display is not required because the terminal (FIG. 2) comprises its own character generator 204. Consequently, locally generated video modulator 11 is optional. Instead, system manager 12 generates a template for the keyboard terminal actions, data and commands to generate screens, and not the screens themselves, for transmission via addressable transmitter 10 to an interactive terminal according to the present invention. In a "hybrid" system comprising terminals having no character generator and terminals according to the present invention, locally generated video modulator 11 would be necessary. The screens generated either at the terminal or by way of modulator 11 for example, may relate to the provision of information to guests or patients about hotel or hospital services, respectively.

Also according to FIG. 1, system manager 12 controsl an addressable transmitter/receiver 10 for transmitting addressed communications which are uniquely addressed to terminals 7, 8 or 9 and receiving communications at random times or in response to polling requests at terminals. The addressable transmitter 10 according to FIG. 1 may transmit addressed information on a separate data carrier, for example, at 108 megahertz and receive information transmitted in a so-called upstream direction from the terminals on another separate data channel at 25 megahertz. Communications in the upstream direction may, for example, comprise request to transmit teletext screens by name or number to the terminal for storage in terminal memory according to a service request entered by the user through the terminal keyboard. In an alternative embodiment, all downstream communications may be transmitted in band or within a particular television channel transmission, for example, within the horizontal or vertical intervals of transmitted video signals. Consequently, the system manager 12 accomplishes in band signaling by controlling data input into the video signals transmitted via either modulator 5 or 11 (not shown). A separate data carrier for each direction of transmission may be preferred due to the increased data carrying capacity. For upstream transmission, a telephone line or spread spectrum transmission may be employed as an alternative to a separate data channel.

Besides specifically addressed data communications with the interactive terminals 7, 8 or 9, the sytem may also address communications globally to all interactive terminals which communications may or may not required a terminal to respond. Such global communications, for example, may be addressed to a global address representing all terminals in the particular hotel system or to a group address representing a group of terminals within the system having a commonality of interest.

The problem solved by the present invention relates to the facilitation of the display of teletext screens via interactive terminal 7, 8 or 9 according to the present invention. The user of a terminal activates his terminal by activating a power on button and turning on his associated television receiver. The user then activates teletext service by choosing one of many possible options: room service, pay-per-view events, checkout, hotel information telephone message retrieval or in room shopping. These options are exemplary only of possible options to which the present invention may be applied to advantage. Teletext screen as used herein is the term of art related the interactive provision of a screen of text and graphics for display on a television signal receiver.

To demonstrate the principles of providing background audio for teletext service, the user, for example, may request a display screen describing room service. The template and other data stored in memory of terminal 7, 8 or 9 is regarded typically by a microprocessor and commands are generated to display the first of several screens associated with room service. Simultaneously, data of the template is regarded for frequency or other turning data stored for background audio channel. Further, a flag is regarded indicating enablement of background audio. Under microprocessor control, the programmed audio channel is tuned and accompanies the displayed screen.

Figure 2:
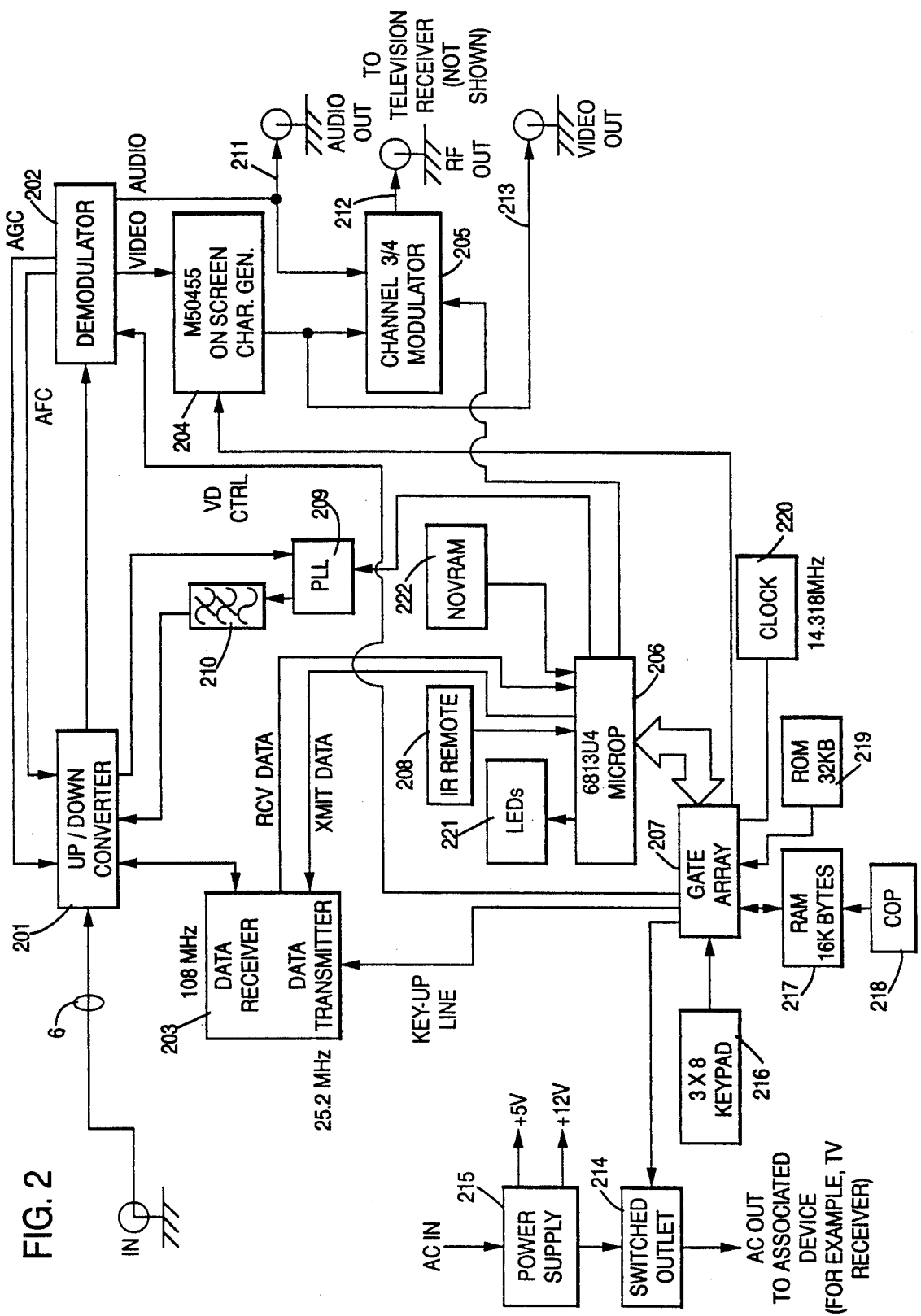
FIG. 2 is a block schematic diagram of a 2-way interactive terminal according to the present invention comprising a microprocessor, a memory, a tuner, a character generator, switches and a television signal output to an associated television receiver.

Further details of providing room service from a terminal 7, 8, or 9 or according to FIG. 2 are found in U.S. application Ser. No. 07,340-642, filed concurrently herewith, entitled "Cable Television Transaction Terminal" and incorporated herein by reference.

To demonstrate the principles of providing background video, the user, for example, may request display of a premium channel for which the user must pay for the privilege of viewing. A display screen associated with such pay-per-view service is then associated with the user request. A template for the screen is retrieved from memory for display which might read: "You are now watching a free preview, to purchase, depress the buy key." Associated with the template is the premium channel which will be displayed as the background for the teletext screen. Depending on whether the background audio is enabled, the user will also be able to listen to the program audio.

Referring to FIG. 2, there is shown a two-way interactive terminal according to the present invention. The terminal is coupled via facility 6 to video modulator 5, addressable transmitter/receiver 10 and locally generated video modulator 11, if provided, as shown in FIG. 1.

In particular, a two-way interactive terminal according to the present invention comprises an up/down converter 201 for converting channels received over the facility 6 for display at an associated television receiver (not shown) or for transmitting data modulated to 25 megahertz by data transmitter 203 for transmission over facility 6. As explained earlier, this data may comprise a request to add a teletext screen and associated data to terminal memory. The television channels received over facility 6 may comprise audio, video or both. Up/down converter 201 passes data on the separate data carrier at 108 megahertz for demodulation and reception at data receiver 203. Received television entertainment signals (audio/video) are provided by up/down converter 201 the demodulator 202 which also provides automatic frequency control and gain control of up/down converter 201. Demodulator 202 provides video via on screen character generator 204 to channel 2/3 modulator 205. In this manner, on screen character generation may appear superimposed upon an incoming video signal or display in the form of a teletext screen, for example, text on a plain colored background. The text screen, also, may be accompanied by background video or audio or both according to the present invention. Also at demodulator 202 the baseband audio channel is transmitted to audio output 211 or via channel modulator 205 to the television receiver at radio frequency. In addition, a baseband video output 213 may be provided from on screen character generator 204 at video output jack 213.

The interactive terminal of the present invention further comprises a processor 206 for controlling data transmission and reception at data/receiver transmitter 203. Processor 206 also controls character generation at character generator 204 via gate array 207. Also via gate array 207, the processor 206 controls a key pad 216 which may be directly coupled to the gate array or coupled via infrared or other remote control transmission link receiver 208. Random access memory (RAM) 217, provided with backup power by capacitor 218, stores character screen templates, data and associated commands, downloaded feature data and other data received over the data transmission link via data receiver 203 from the system manager responsive to processor 206 control. The processor 206 also has access to a nonvolatile random access memory 222 and access via gate array 207 to an outboard read only memory (ROM) 219. Processor 206 receives remote contro key commands from a remote control key pad via infrared or other remote control transmission receiver 208. Processor 206 may also control the operation of a phase lock loop 209 and bandpass filter 210 for controlling operation of the up/down converter 201. Consequently, any incoming channel may be tuned at the request of processor 206.

Power is supplied via an alternating current input to power supply 215 which provides, for example, a plus 5 volts and a plus 12 volt DC input to various components of the terminal requiring such power. Furthermore, the alternating current power input to power supply 215 may be provided via a controlled switch outlet 214 to an associated device such as the television receiver associated with the terminal. The state of the switched outlet 214 is controlled via gate array 207 by processor 206. For example, the switched outlet 214 may continuously provide power to its associated device or provide power only when an "on" button of key pad 216 or a remote control key pad is set to an on condition.

Values inside of boxes or associated with boxes are exemplary of memory sizes, clock rates, or component types. For example, clock 202 for clocking the microprocessor operation may operate at 14.318 megahertz. The clock signal is divided down by gate array 207 for operation of the microprocessor 206 which may be a Motorola MC 6803U4 or for clocking other processes of the terminal. The on screen character generator 204, for example, may be a Mitsubishi M50455 component. RAM 217 may comprise 16 kilobytes of memory and ROM 219 comprises 32 kilobytes of memory respectively.

In addition to character generation and screen displays, LEDs 221 may, for example, indicate at least a power on condition or, additionally, an alternative display of tuned channel number or other data which may also be displayed in the foreground on a screen.

Figure 3:
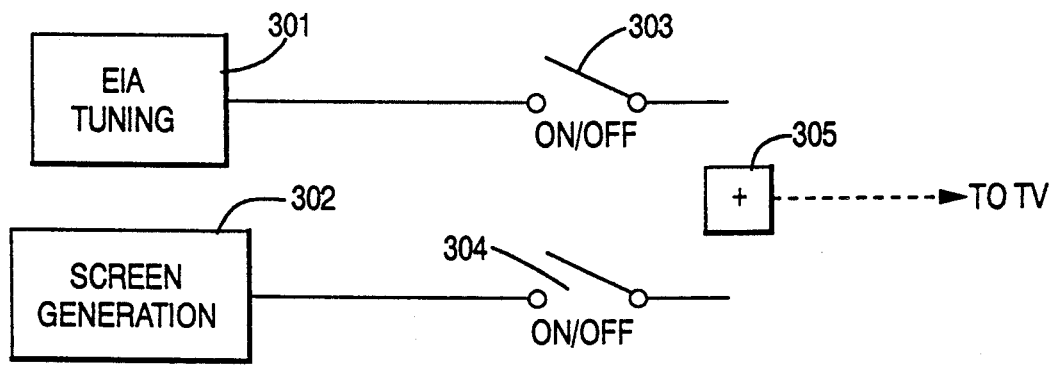
FIG. 3 is a simplified schematic diagram of the terminal of FIG. 2 in which the essential element of the present invention are depicted.

Referring to FIG. 3, the elements of the terminal of FIG. 2 pertinent to the present invention are shown in simplified schematic form. Up/down converter 201 and demodulator 202 are simply represented as an EIA (Electronic Industries Association) channel tuning circuit 301. The on-screen generator 204 is simply represent as screen generation circuit 302. The somewhat complicated control of tuning shown in FIG. 2 is simply shown as first on/off switch 303 of FIG. 3. Simirlarly, the presence or absence of teletext output of generator 204 is represented as second on/off switch 304.

Referring briefly to FIG. 2, video output of demodulator 202 is provided via generator 204 for display. Consequently, generator 204 also provides a video signal summation simply represented by summation circuit 305. Also, gate array 207 controls demodulator 202 in such a way that audio is switchably provided via lead 211 or RF signal 212 depending on whether background audio is enabled or not according to the present invention.

The outputs to the TV can be EIA tuning alone, screen generation alone, or a mixing of screen generation and EIA tuning. For this last opinion the background sound for the particular screen is the corresponding audio for the EIA tuned channel. To view the EIA video, the screen attributes stored in terminal memory for an associated template must be set to "On Screen."

The background audio/video can be configured as any EIA channel in the range of channels provided over the cable television facility. The audio can be muted independently. If no volume exists for a particular screen, the mute volume up and volume down keys of a terminal keyboard have no effect on the volume. Volume bars may be displayed, however. If there is no EIA channel configured, audio is automatically muted. In addition, if the screen attribute is On Screen, the last tuned EIA channel will appear as the background video in the absence of tuning frequency data associated with the screen.

There exist two special EIA channel values for the handling of pay-per-view premium channel services. Since there exist, for example, a lesser number of individually configurable premium channel and only one set of screens associated with purchasing premium channels, the need arises for special handling of background channels. To configure the alternate video channel for the particular premium as the background video channel, one channel may be predetermined as the EIA channel. For the premium channel itself as the background, a second premium channel may be used. If these values are used while not on a premium channel, the first tune EIA channel will appear as the background video and the audio will be muted. Scrambling as indicated above is optional and will only be done for the second premium channel background.

Details of teletext screen design at a system manager location and of screen priority of a terminal memory are described in U.S. application Ser. No. 07,342,987 filed concurrently herewith and incorporated herein by reference. Suffice it to say, however, screen templates are designed and stored in system manager memory by screen number. A templetate filed identified by name and associated with a screen determines what actions the terminal should take in response to the actuation of keys of a terminal keyboard. More importantly, associated with the screen in screen memory is an EIA channel frequency to which the terminal should tune to obtain background audio/video. Another memory flag indicates whether background audio is enabled or not. Further, in an attribute list is included information as to whether "on-screen" status is flagged indicating that the channel indicated by the tunning data or the last-tuned EIA channel appears as background as explained above.

Figure 4A:
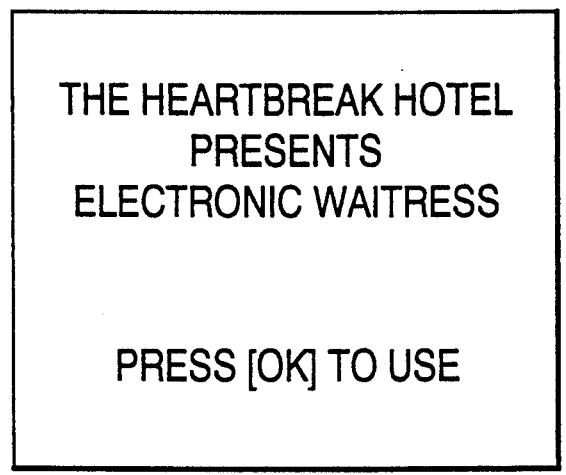
FIG. 4(a) and 4(b) each represent a teletext screen display in accordance with the present invention, FIG. 4(a) being exemplary of background audio and FIG. 4(b) being exemplary of background video or both background audio and video.

Referring to FIG. 4(a), there is shown the first of a series of screens associated with providing room service at a hotel. This screen is accessed, for example, by a user tuning to a channel number for room service. The channel number is unrelated to channel tuning by the terminal. Rather, according to a channel map in memory, the entered channel number may correspond to an identifier for the feature start screen for room service. Typically, as many first screens for different services are stored in terminal memory as possible according to a scheme of teletext screen priority and control. Lower priority screens are stored at the system manager until requested or until it becomes imminent that they will be requested. The screen priority and control arrangement is further described in copending, concurrently filed U.S. application Ser. No. 07,342,987.

Subsequent screens associated with room service relate to dinner menu selections and, for example, choosing modifiers for selected choices i.e., cream and sugar for coffee and medium rare for steak. A description of providing room service via a cable television system is further described in copending concurrently filed U.S. application Ser. No. 07,340,642.

The depicted screen is screen number 500 which is the first screen for room service. Associated with screen 500 in memory will be a flag indicating that background audio is enabled. At the same time, dinner music, for example, is provided via the system manager to the terminal over EIA channel 33. Channel 33 is also associated with screen 500 in memory. Consequently, when the terminal tunes to the EIA frequency for channel 33, dinner music accompanies screen 500. If the sequence of screens for room service becomes 500, 527, 544, 545 and 550 in series as the hotel guest makes their selections, channel 33 background audio will continue to play as background music. Channel 33 is also associated in memory for each of these screens and the background audio flag will be enabled.

A user may use their handheld remote control or terminal keyboard to adjust music volume by actuating appropriate volume keys. At the same time, and according to the key template for the screen, other keys may have different functions depending on their description on the screen, i.e., buy or OK keys.

Figure 4B:
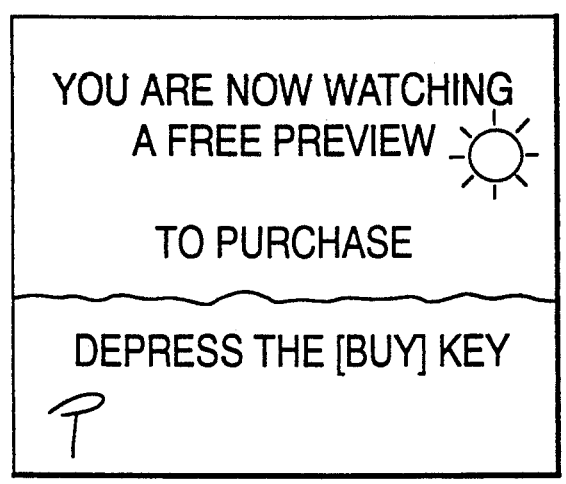

The user may now decide to actuate pay-per-view premium channel service. Preferring to FIG. 4(b), a first instruction screen may be denoted 600. This screen will also have an associated background EIA channel and, if background audio is enabled, background program audio. The preview screen may be timed so that after the predetermined time period passes, the user will thereafter be denied having the program appear in the background. A second predetemined period of time may be associated with a teletext screen that is longer or shorter than the preview time. For example, if longer, the screen will urge the viewer to press the buy key after the preview is over. If shorter, a series of screens may be displayed during the preview time, the series of screens providing more detailed instructions than could appear in just one screen.

Thus, there has been described apparatus for use in a cable television terminal for prescribing a background audio/video channel to which the terminal should tune to obtain background audio/video or both for a textual screen of information. In this manner, one may, for example, show a preview of a movie in the background of a textual set of instructions to a viewer of how to purchase the movie. Alternatively, the viewer may be provided with appropriate background music to accompany his choice of dinner selection from an in-room service menu. Other applications of the principles behind the present invention would be readily apparent to one of skill in the art.

We claim:

1. Apparatus for use in a television terminal for selectively providing a background video or audio signal or both for accompanying display of a screen of textual information in the foreground, the apparatus comprising
   - tuning means for tuning a predetermined background channel, the predetermined background channel comprising a video signal, or an audio signal, or both a video and audio signal;
   - teletext generating means for generating information for foreground display;
   - switching means coupled to the tuning means and the teletext generating means for selectively switching the output of the tuning means as a background video or audio, or both video and audio for the foreground output of the teletext generating means; and
   - control means, responsive to selection of a particular screen of textual information for display, for controlling the switching means and the tuning means.

2. Apparatus according to claim 1 further comprising a read/write memory for temporarily storing data associated with the particular textual information screen, the data indicating whether background audio is enabled.

3. Apparatus according to claim 1 further comprising a read/write memory for temporarily storing data associated with the particular textual information screen, the data indicating the predetermined channel to which the tuning means tunes.

4. Apparatus according to claim 3 further comprising a read/write memory for temporarily storing data associated with the particular textual information screen, the data detemining whether the predetermined channel should be displayed in the background or the last channel to which the terminal was tuned.

5. Apparatus for use in a television terminal for selectively providing a background video or audio signal or both for accompanying display of a screen of textual information in the foreground, the apparatus comprising:
   - tuning means for tuning to a predetermined background channel, the predetermined background channel comprising a video signal, or an audio signal, or both a video and audio signal;
   - first switching means for selectively switching the output of the tuning means,
   - teletext generating means for generating textual information for foreground display,
   - second switching for selectively switching the output of the teletext generating means,
   - summation means for summing the output of the first and second switching means,
   - control means, responsive to selection of a particular screen of textual information for display, for controlling the first and second switching means and the tuning means, and
   - memory means for temporarily storing data associated with the particular textual information screen, the data indicating whether background audio is enabled and the predetermined channel to which the tuning means tunes.

6. A method for use in a television terminal for selectively providing a background video or audio signal or both for accompanying display of a screen of textual information, the method comprising the steps of:
   - storing a screen of textual information and associated data of a predetermined background channel,
   - retrieving the textual information for display in the foreground responsive to user selection,
   - tuning to the predetermined background channel as a background, and
   - selectively switching the background channel to provide background video, background audio or both.

7. A method at a terminal for accompanying a particular teletext service with background audio, the teletext service comprising a plurality of associated screens, the method comprising the steps of:
   - associating a predetermined background audio channel with each screen of the plurality of screens associated with the particular teletext service, and
   - tuning to the background audio channel during display of any screen associated with the particular teletext service.

* * * * *